(12) United States Patent
Bierbaum et al.

(10) Patent No.: US 7,797,248 B1
(45) Date of Patent: Sep. 14, 2010

(54) AUTOMATED CONFIRMATION OF TRANSIT CARD FUND REPLENISHMENT

(75) Inventors: Christopher J. Bierbaum, Overland Park, KS (US); Robin D. Katzer, Olathe, KS (US); Todd N. Koellner, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/172,085

(22) Filed: Jul. 11, 2008

(51) Int. Cl.
*G06Q 20/00* (2006.01)
(52) U.S. Cl. .............................. 705/66; 705/1.1; 705/35; 705/39; 705/41; 705/44; 705/68; 705/77
(58) Field of Classification Search .................... 705/35
See application file for complete search history.

(56) References Cited

U.S. PATENT DOCUMENTS

| 7,356,541 B1 * | 4/2008 | Doughty ..................... 707/102 |
| 2002/0133409 A1 * | 9/2002 | Sawano et al. ................ 705/16 |
| 2007/0150949 A1 * | 6/2007 | Futamura et al. .............. 726/22 |

OTHER PUBLICATIONS

Balaban, Dan. "Japan Goes Mobile With Transit Ticketing," Card Technology, (May 2006), vol. 11, Iss. 5, p. 18-20.*

Gregoire, Lisa. "Visa Removes Canada 3000 Credit Charge," Edmonton Journal, (Mar. 9, 2002), p. B.7.*

* cited by examiner

*Primary Examiner*—Kambiz Abdi
*Assistant Examiner*—Elizabeth H Rosen

(57) ABSTRACT

An electronic transit fare payment system is disclosed. The system comprises a plurality of mobile devices adapted to store a transit fare payment application and a server in wireless communication with the mobile devices. The transit fare payment application decrements a transit fare funds balance by a fare amount after completing a transit ride, wirelessly requests a top-up of the transit funds balance when the transit funds balance drops below a threshold, wirelessly receives a top-up instruction, increments the transit fare funds balance in response to executing the top-up instruction, and wirelessly transmits a top-up confirmation. The server receives the request for the top-up, charges the top-up to a credit card associated with the mobile device requesting the top-up, transmits the top-up instruction to the mobile device requesting the top-up, receives the top-up confirmation. When the top-up confirmation is not received, the server requests top-up confirmation from the mobile device. When the mobile device does not reply to the request, the server analyzes a transit fare transaction history associated with the mobile device to determine that the top-up has completed. When the top-up is not confirmed, the server rolls-back the charge of the top-up to the credit card associated with the mobile device.

9 Claims, 6 Drawing Sheets

AUTOMATED CONFIRMATION OF TRANSIT CARD FUND REPLENISHMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A point-of-sale (POS) terminal may receive payment information from a contactless card. A contactless card communicates with a point-of-sale terminal or other device at least in part without physically contacting the point-of-sale terminal, for example through radio frequency communication conducted in the proximity of the point-of-sale terminal. This radio frequency communication may include near field communication (NFC) technology. Other contactless communication links may be established using optical signals and/or sonic signals. In one payment scenario, a commuter may present a transit card to pay a fare and obtain access to a transportation provider vehicle, for example a bus, a train, or a subway train. In another payment scenario, an electronic purse may be provided as an application on a portable electronic device, for example on a mobile phone, a personal digital assistant, or other device, a payment may be made from the electronic purse. In some designs, some financial information, for example fund balances, may be stored in a limited access portion of memory referred to as a secure element (SE).

SUMMARY

In an embodiment, a method of managing a transit card is provided. The method comprises wirelessly transmitting a command to replenish funds in the transit card. When a confirmation of replenishment of funds in the transit card is received, the method comprises recording the completion of the command to replenish funds in the transit card. When a confirmation of replenishment of funds in the transit card is not received before a confirmation time out period expires, the method comprises wirelessly transmitting a query about a funds replenishment status of the transit card and receiving a response to the query. When the response indicates the funds in the transit card are replenished, the method comprises recording the completion of the command to replenish funds in the transit card. When the response does not indicate the funds in the transit card are replenished, the method comprises analyzing a transaction history associated with the use of the transit card. When an inference that the funds in the transit card are replenished results from analyzing the transaction history, the method comprises recording the completion of the command to replenish funds in the electronic wallet. When an inference that the funds in the transit card are not replenished results from analyzing the transaction history, the method comprises reporting a transit card funds replenishment anomaly.

In an embodiment, a method of managing a balance of a transit card is provided. The method comprises wirelessly receiving a request to add funds to the transit card, requesting a charge in the amount of the funds to a credit card, and wirelessly transmitting an instruction to increment the balance of the transit card by the amount of the funds. When a confirmation that the balance of the transit card is incremented is not received, the method comprises wirelessly requesting a status of the transit card. When the status of the transit card does not confirm that the balance of the transit card is incremented, the method comprises analyzing a transaction history associated with the transit card. When the analyzing the transaction history cannot confirm that the balance of the transit card is incremented, the method comprises backing out the charge to the credit card in the amount of the funds. When the charge to the credit card cannot be backed out, the method comprises reporting an anomaly of the balance of the transit card.

In an embodiment, an electronic transit fare payment system is disclosed. The system comprises a plurality of mobile devices adapted to store a transit fare payment application and a server in wireless communication with the mobile devices. The transit fare payment application decrements a transit fare funds balance by a fare amount after completing a transit ride, wirelessly requests a top-up of the transit funds balance when the transit funds balance drops below a threshold, wirelessly receives a top-up instruction, increments the transit fare funds balance in response to executing the top-up instruction, and wirelessly transmits a top-up confirmation. The server receives the request for the top-up, charges the top-up to a credit card associated with the mobile device requesting the top-up, transmits the top-up instruction to the mobile device requesting the top-up, receives the top-up confirmation. When the top-up confirmation is not received, the server requests top-up confirmation from the mobile device. When the mobile device does not reply to the request, the server analyzes a transit fare transaction history associated with the mobile device to determine that the top-up has completed. When the top-up is not confirmed, the server rolls-back the charge of the top-up to the credit card associated with the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
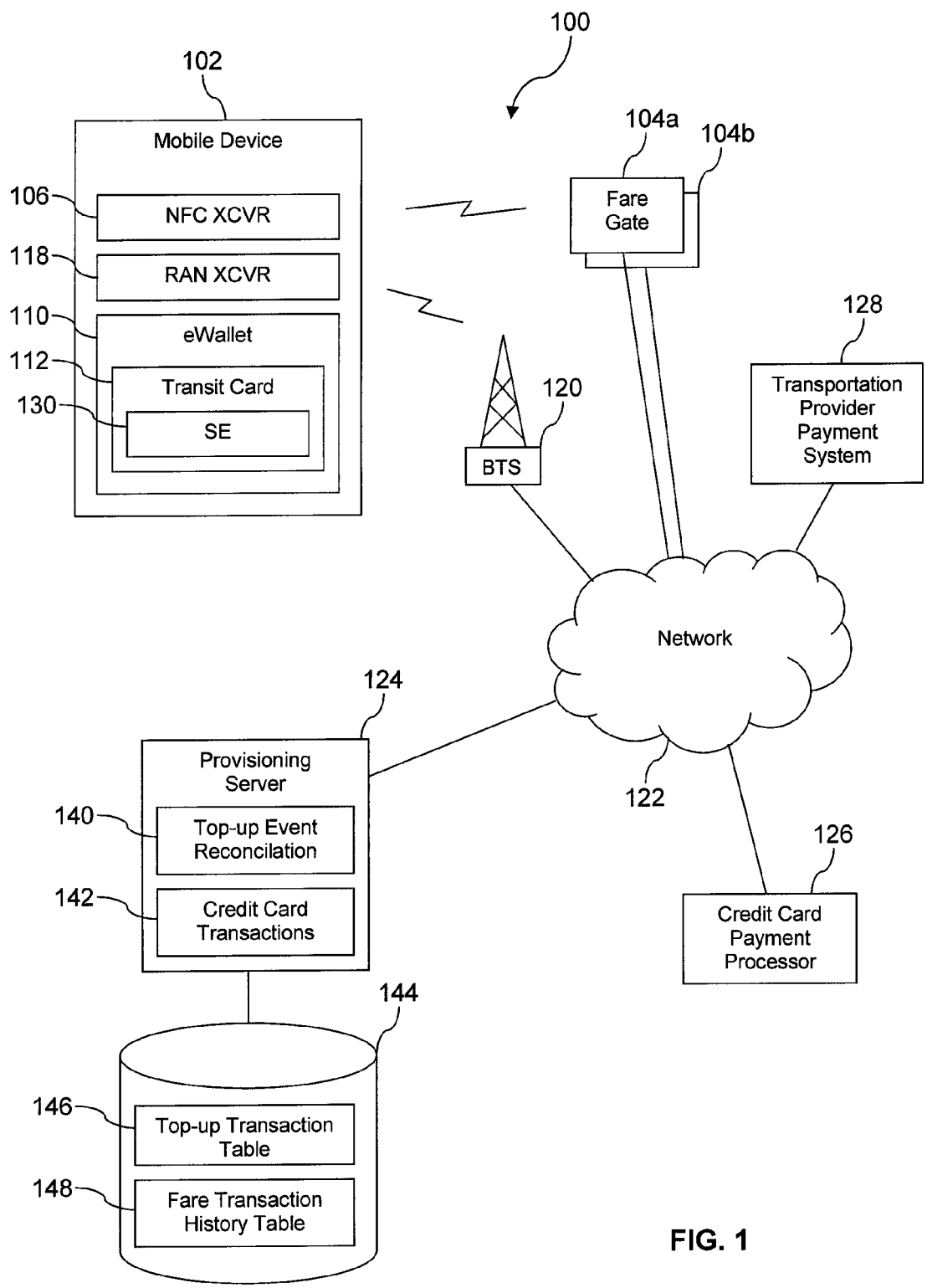
FIG. 1 illustrates an electronic payment system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method of automated confirmation of replenishment of funds in a mobile electronic device, for example in an electronic purse application of the mobile device and/or a transit card application of the mobile device, is disclosed herein. In an embodiment, payment for use of the transportation services is advanced to a transportation provider payment system by charging a credit card associated with the mobile device, for example a credit card belonging to a user of the mobile device. The exchange of the payment for actual use of the transportation services is managed by allocating funds substantially equivalent to the payment to a funds balance of the transit card application on the mobile device and decrementing the funds balance of the transit card application as the mobile device is used to access the transportation system. For example, the user may present their mobile device to a fare gate to record an entry into the transportation system and again present their mobile device to a fare gate to calculate and deduct a fare from the funds balance of the transit card application on exit from the transportation system.

When the funds balance of the transit card application drops below an established threshold, the transit card application initiates a funds replenishment transaction. In an embodiment, the mobile device sends a replenishment request to the provisioning server via a wireless communication link between the mobile device and a base transceiver station (BTS) and via a wired communication link from the base transceiver station to the provisioning server. In response to the replenishment request, the provisioning server initiates the payment to the transportation provider payment system by charging the credit card associated with the mobile device. Upon initiating the credit card payment, the provisioning server sends an instruction to the mobile device—via the wired communication link to the base transceiver station and via the wireless communication link from the base transceiver station to the mobile device—to allocate appropriate funds to the funds balance of the transit card application. Under normal conditions, the instruction is received by the mobile device, the appropriate funds are allocated to the funds balance of the transit card application, the mobile device sends a replenishment confirmation to the provisioning server, and the provisioning server records the replenishment transaction as confirmed and/or completed.

Under some conditions, however, the provisioning server may not receive the expected replenishment confirmation. In one circumstance, the wireless communication link between the mobile device and the base transceiver station may be unavailable, for example the wireless link may go out of service after the mobile device requests the funds replenishment, and the instruction to allocate funds to the funds balance of the transit card application that is sent by the provisioning server is not received by the mobile device. In another circumstance, the mobile device may be turned off, for example because the power level of the mobile device drops below a threshold and the mobile device automatically turned off, and the instruction to allocate funds to the funds balance to the transit card application sent by the provisioning server is not received by the mobile device. In another circumstance, however, the instruction to allocate funds to the funds balance of the transit card application is received by the mobile device, the funds are allocated to the funds balance of the transit card application, but the replenishment confirmation cannot be sent by the mobile device, for example because the power level of the mobile device drops below a threshold and the mobile device automatically turns off. In another circumstance, the instruction to allocate funds to the funds balance of the transit card application is received by the mobile device, the funds are allocated to the funds balance of the transit card application, the replenishment confirmation is sent by the mobile device, but the wireless communication link between the mobile device and the base transceiver station is out of service. A variety of other operating scenarios may also interfere with the completion of the replenishment transaction.

One approach to addressing the alternative replenishment scenarios is to rely upon the user of the mobile device to determine that the replenishment transaction has not completed and to request an adjustment through a human operator associated with the transportation provider. This approach, however, may involve greater operational costs for the transportation provider, loss of time for the user of the mobile device, and loss of satisfaction with the transportation system. A system and a variety of methods of automated confirmation of funds replenishment that address some of the alternative replenishment scenarios and reduce the number of occasions that a user of the transportation system resorts to requesting operator adjustments are described herein. It is contemplated that the system and methods disclosed herein may be generally applicable beyond the transportation system payment system described in detail herein after and may also apply, for example, to replenishment procedures associated with an electronic purse application or other electronic payment applications that may reside on the mobile device.

In one embodiment, when no confirmation of replenishment of the funds in the transit card is received, the provisioning server sends a query to the mobile device. If the mobile device confirms replenishment, the provisioning server records the replenishment transaction as confirmed and/or completed. If the mobile device replies that no instruction to allocate funds was received, the provisioning server may retransmit the replenishment request. When the mobile device does not reply to the query, the provisioning server may periodically retransmit the query a limited number of times or for a limited duration of time. When the mobile device does not reply to the query within the limited number of retries or the limited duration of time, for example because the mobile device is out of wireless communications or is powered off, the provisioning server may try to infer the replenishment state of the transit card application on the mobile device from analyzing a transit card transaction history. For example, if a first transit card record indicates a first balance and the next transit card record indicates a second balance, where the second balance is greater than the first balance, the provisioning server may infer that the replenishment transaction completed. In the event that the provisioning server cannot draw an inference that the replenishment transaction completed, the provisioning server may generate and transmit a replenishment anomaly report to the transportation provider for investigation by an operator or other employee of the transportation provider. Alternatively, the provisioning server may attempt to back-out the transaction to increase timeliness and customer satisfaction, for example by backing out a credit card payment before the payment settles with the credit card issuer.

Turning now to FIG. 1, a system 100 for payment for transportation services with a transit card application on a mobile device is described. The system 100 comprises a plurality of mobile devices 102 (only one mobile device is shown) and a plurality of fare gates 104 (only two fare gates shown, an entry fare gate 104a and an exit fare gate 104b). The mobile device 102 may be presented to the entry fare gate 104a, for example the mobile device 102 may tap the entry fare gate 104a, and information may be exchanged between the mobile device 102 and the entry fare gate 104a to gain entrance to the transportation system, for example a bus, a subway or train platform, or other. The mobile device 102 may be any of a variety of portable electronic devices including a mobile phone, a personal digital assistant, a media player, a digital camera, a laptop computer, a tablet computer, and others. In some embodiments, the entry fare gate 104a and/or the exit fare gate 104b may function both as an entry and an exit fare gate. An exemplary embodiment of the mobile device 102 is described in detail hereinafter.

The exchange of information between the mobile device 102 and the entry fare gate 104a may be carried over a contactless communication link, for example over a near field communication (NFC) link. In an embodiment, the mobile device 102 may comprise a near field communication transceiver 106 to promote near field communications with fare gates 104 and other devices. The user of the mobile device 102 may ride on the transportation vehicle to a destination point where the mobile device 102 may be presented to the exit fare gate 104b, for example the mobile device 102 may tap the exit fare gate 104b, and information may be exchanged between the mobile device 102 and the exit fare gate 104b to calculate the fare for traveling to the destination point, to deduct the fare from a funds balance of a transit card application 112 contained in an electronic wallet 110 of the mobile device 102, and to exit the transportation system.

The mobile device 102 also comprises a radio access network (RAN) transceiver 118 with which the mobile device 102 communicates over a wireless link with a base transceiver station (BTS) 120. The base transceiver station 120 provides communications connectivity to a network 122 to the mobile device 102 through a wired communication link and/or a wireless communication link. The system 100 further comprises a provisioning server 124, a credit card payment processor 126, and a transportation provider payment system 128 that communicate via wired and/or wireless connections to the network 122. The fare gates 104, the provisioning server 124, the credit card payment processor 126, and the transportation provider payment system 128 may each be implemented as a general purpose computer system. General purpose computer systems are described in more detail hereinafter.

In an embodiment, the transit card application 112 may be downloaded to the mobile device 102 from the provisioning server 124, for example when the user of the mobile device 102 requests or subscribes to the transportation provider payment system 128. The provisioning server 124 may wirelessly transmit the transit card application 112 to the mobile device 102, for example by sending the transit card application 112 over a wired link to the base transceiver station 120 via the network 122 and via a wireless link from the base transceiver station 120 to the mobile device 102. The provisioning server 124 may wirelessly transmit the transit card application 112 to the mobile device 102 with a zero balance, that is with a funds balance of zero on the transit card application. When the funds balance of the transit card application 112 drops below a threshold, for example below a threshold of about ten dollars, the transit card application 112 initiates a replenishment transaction. In some contexts the threshold may be referred to as a predefined quantity. In some contexts herein, the replenishment transaction may also be referred to as a top-up. In a normal top-up, the mobile device 102 sends a replenishment request to the provisioning server 124 via the wireless link between the mobile device 102 and the base transceiver station 120 and via the wired link between the base transceiver station 120, the network 122, and the provisioning server 124. The provisioning server 124 sends a credit card payment request to the credit card payment processor 126 via the network 122. In an embodiment, the provisioning server 124 may comprise a credit card transactions component 142 to manage communications and/or interactions with the credit card payment processor 126. The credit card payment processor 126 validates the request and, if the subject credit card account balance after the payment remains within any applicable credit limits and if any authentication information is verified, returns a charge approved response to the provisioning server 124.

The credit card payment processor 126 provides a payment to the transportation provider payment system 128 via the network 122. In an embodiment, the payment amount may be a predefined amount of money, for example about forty-five dollars. In other embodiments, a different predefined amount of money may be used. In yet other embodiments, the amount of payment is defined by the mobile device 102 in its replenishment request, and the credit card payment processor 126 provides payment in the amount to the transportation provider payment system 128. In an embodiment, the completion of the credit card transaction and transfer of funds to the transportation provider payment system 128 remains pending until a periodic settlement time, for example an about hourly settlement time or an about daily settlement time.

After the provisioning server 124 has received the charge approved response from the credit card payment processor 126, the provisioning server 124 sends an instruction to the mobile device 102 to allocate appropriate funds to the funds balance of the transit card application 112. In an embodiment, the transit card application 112 may allocate funds equal to the payment amount that is to be made to the transportation provider payment system 128, for example about forty-five dollars. In another embodiment, however, a different amount of funds may be allocated to the funds balance of the transit card application 112. For example, in an embodiment, the transportation provider payment system 128 may provide an incentive for using the transit card application 112 by granting that for a payment of forty-five dollars an allocation of forty-eight dollars to the funds balance of the transit card application 112 is permitted. In another embodiment, a different incentive value may be provided.

When the mobile device 102 receives the instruction to allocate funds, the instruction is provided to the transit card application 112. In an embodiment, the transit card application 112 may execute the instruction and increment the funds balance promptly. In another embodiment, however, the transit card application 112 may place the instruction in a secure element 130 of the transit card application 112 where the instruction will remain pending until a trigger event causes the instruction to be processed and the funds balance to be incremented by code or instructions inside the secure element 130. In an embodiment, the trigger event that causes the instruction to be processed and the funds balance to be incremented may be tapping the exit fare gate 104b. In another embodiment, however, a different trigger event may be employed. Making the execution of the instruction depend upon a triggering event associated with the transportation company and/or transit authority allows the transportation company to maintain tighter control and/or access to the sensitive portions of the secure element 130.

After the mobile device 102 receives the instruction to allocate funds, the mobile device 102 transmits a replenishment confirmation to the provisioning server 124. When the provisioning server 124 receives the replenishment confirmation, the provisioning server 124 may judge the top-up to be completed and/or confirmed. In an embodiment, the provisioning server 124 is in communication with a database 144 that comprises a top-up transaction table 146. The top-up transaction table 146 includes records related to top-up transactions. Each record in the top-up transaction table 146 may identify the mobile device 102 and a top-up transaction state as one of tentative, confirmed, or other states. The provisioning server 124 may create a new record in the top-up transaction table 146 when the provisioning server 124 receives the charge approved response from the credit card payment processor 126. After sending the instruction to allocate funds to the mobile device 102, the provisioning server 124 may set the state of the associated record in the top-up transaction table 146 to tentative. After receiving the replenishment confirmation from the mobile device 102, the provisioning server 124 may set the state of the associated record in the top-up transaction table 146 to confirmed.

It will be appreciated that a number of time lags and pending operations may occur in the system 100. For example, while the transit card application 112 may have replenished its funds, the actual payment and/or transfer of funds to the transportation provider payment system 128 may not occur until later, for example until a later settlement time. Again, while the actual payment and/or transfer of funds to the transportation provider payment system 128 may have occurred and the settlement time passed, the funds balance of the transit card application 112 may not have been replenished, topped-up, or incremented, for example if the mobile device 102 has not tapped on the exit fare gate 104*b* or if the mobile device 102 was powered down after the mobile device 102 transmitted the replenishment request but before receiving the instruction to allocate funds to the funds balance of the transit card application 112.

In an embodiment, the provisioning server 124 may comprise a top-up event reconciliation component 140 that monitors the progress of top-up transactions and performs automated confirmation of top-up transactions. In another embodiment, a different portion and/or component of the provisioning server 124 may provide similar functionality. The top-up event reconciliation component 140 may analyze the top-up transaction table 146 on a periodic basis and take action to attempt to confirm top-up transactions that are associated with a record in the top-up transaction table 146 that has a tentative state. For example, the top-up event reconciliation component 140 may trigger the provisioning server 124 to send a query to the mobile device 102 to ask if the mobile device 102 has received the instruction to allocate funds. If the mobile device 102 replies that the instruction to allocate funds has been received, the top-up event reconciliation component 140 may set the associated record in the top-up transaction table 146 to confirmed. If the mobile device 102 replies that the instruction to allocate funds has not been received, the top-up event reconciliation component 140 may trigger the provisioning server 124 to resend the instruction to allocated funds to the mobile device 102. In an embodiment, rather than setting the associated record in the top-up transaction table 146 to confirmed, the top-up event reconciliation component 140 may remove the associated record from the top-up transaction table 146. If the mobile device 102 does not reply to the query, the top-up event reconciliation component 140 may periodically retransmit the query to the mobile device 102, either for a predefined number of attempts or for a predefined duration of time.

If the top-up event reconciliation component 140 does not receive a reply from the mobile device 102 after exhausting the predefined number of attempts or the predefined duration of time, the top-up event reconciliation component 140 may attempt to infer the top-up state of the transit card application 112 of the mobile device 102 from an analysis of fare transactions between the mobile device 102 and the fare gates 104. In an embodiment, the provisioning server 124 may have access to a record of fare transactions completed using the transit card application 112 of the mobile devices 102. In an embodiment, the transportation provider may push a selection of fare transactions to the provisioning server 124 in a batch mode on a periodic basis, for example about hourly or about daily. Alternatively, the provisioning server 124 may request selected fare transactions from the transportation provider when needed, for example to confirm top-up transaction states. The fare transactions may be stored in the database 144 as records in a fare transaction history table 148.

The top-up event reconciliation component 140 may analyze the fare transaction history table 148 to infer the top-up state of the mobile device 102. For example, if the top-up event reconciliation component 140 finds a first fare transaction record associated with the mobile device 102 having a first funds balance of the transit card application 112 and a second fare transaction record associated with the mobile device 102 having a funds balance greater than the first funds balance, if the second fare transaction record has a timestamp later than a timestamp associated with the provisioning server 124 sending the instruction to allocate funds to the transit card application 112 of the mobile device 102, the top-up event reconciliation component 140 may infer that the top-up transaction completed. In an embodiment, the top-up event reconciliation component 140 may further condition the inference that the top-up transaction completed on the determination that the second fare transaction record is the next fare transaction of the transit card application 112 of the mobile device 102 in sequence after the first fare transaction.

The top-up event reconciliation component 140 may draw the negative inference that the top-up transaction did not complete if a contiguous time ordered sequence of fare transactions show an always decreasing fund balance of the transit card application 112 of the mobile device 102 and the contiguous time ordered sequence of fare transactions begins before the timestamp of the instruction to allocate funds to the transit card application 112 and extends after the timestamp of the instruction to allocate funds to the transit card application 112. If the negative inference is drawn, the top-up event reconciliation component 140 may trigger the provisioning server 124 to resend the instruction to allocate funds to the mobile device 102.

When the top-up event reconciliation component 140 cannot draw any inference from analyzing the fare transaction history table 148, for example when no records in the fare transaction history table 148 associated with the mobile device 102 bear a timestamp later than the timestamp of the instruction to allocate funds to the transit card application 112, the top-up event reconciliation component 140 may periodically retry the analysis at a later time. After a predefined number of retries or after a predefined duration of time, however, the top-up event reconciliation component 140 may discontinue attempts to infer the state of the top-up transaction. When the top-up event reconciliation component 140 discontinues attempts to infer the state of the top-up transaction, the top-up reconciliation component may transmit a report or other notice to an operator or other member of the transportation provider to promote human intervention and resolution of the unconfirmed top-up transaction. While in this case human and/or manual intervention is employed, it is anticipated that many, even a majority, of the various top-up scenarios that would otherwise have been deferred to operator resolution may be automatically resolved by the disclosed system and methods.

Figure 2:
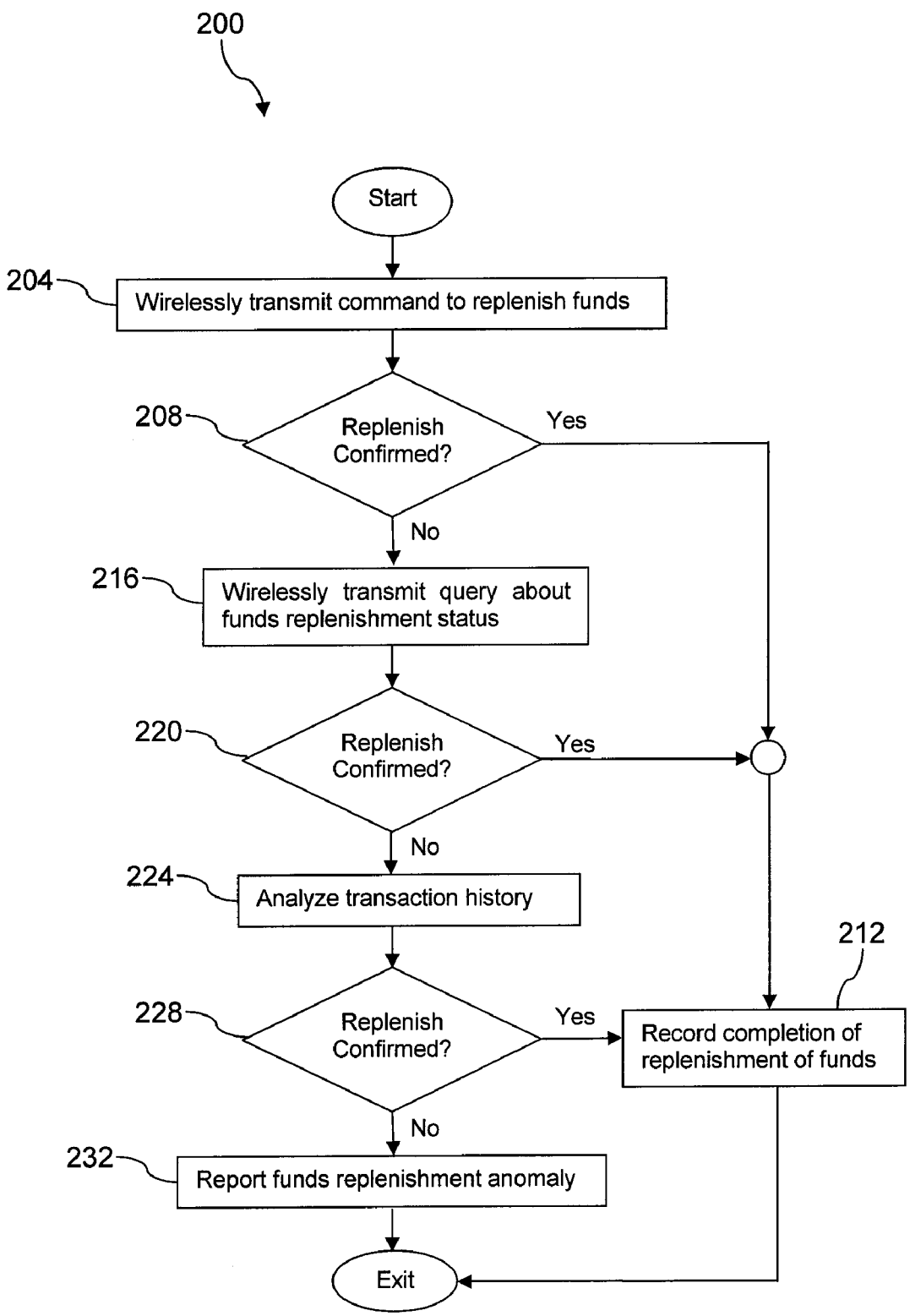
FIG. 2 is a flow chart of a method according to an embodiment of the disclosure.

Turning now to FIG. 2, a method 200 of automated confirmation of replenishment is discussed. In block 204, a command to replenish funds in a transit card is wirelessly transmitted. This command may be sent by the provisioning server 124 to the mobile device 102 via a wired link from the provisioning server 124 to the base transceiver station 120 via the network 122 and via a wireless link from the base transceiver station 120 to the mobile device 102. This command may also be referred to as an instruction to allocate funds. In some scenarios, this may lead to the transit card application 112 on the mobile device 102 incrementing the funds balance by substantially the amount paid with a credit card associated with the mobile device 102 to the transportation provider payment system 128.

In block 208, if the replenishment is confirmed, for example if the mobile device 102 sends a replenishment confirmation to the provisioning server 124, the method 200 proceeds to block 212 where the completion of the replenishment of funds action is recorded. This may also be referred to as the completion of a top-up transaction. In block 208, if the replenishment is not confirmed, for example if no replenishment confirmation is received by the provisioning server 124 before a timeout period expires, the method 200 proceeds to block 216. In block 216, a query about the replenishment status or top-up status of the transit card application 112 is wirelessly transmitted. In an embodiment, the query may be sent by the provisioning server 124 to the mobile device 102, via a wired link, from the provisioning server 124 to the base transceiver station 120 via the network 122, and via a wireless link from the base transceiver station 120 to the mobile device 102.

In block 220, if the replenishment is confirmed, for example if the mobile device 102 sends a query response that indicates the top-up transaction has completed and/or the instruction to allocate funds to the funds balance of the transit card application 112 has been received, the method 200 proceeds to block 212 where the completion of the replenishment of funds is recorded. If the mobile device 102 sends a query response that indicates that no replenishment instruction or replenishment command has been received by the mobile device 102, the provisioning server 124 may resume the process at block 204 and wirelessly retransmit the replenishment command. If the mobile device 102 does not reply to the query response, the method 200 may retry wirelessly transmitting the query several times over the course of one hour, two hours, or three hours. If the mobile device 102 does not reply after a predefined number of retries or after a predefined duration of time, the method 200 proceeds to block 224.

In block 224, a fare transaction history is analyzed in an attempt to draw an inference that the replenishment transaction has been completed or that the replenishment command was not received by the mobile device 102. The provisioning server 124 may analyze the fare transaction history table 148 associated with the mobile device 102 to find a later fare transaction associated with a higher funds balance on the transit card application 112 relative to an immediately preceding in sequence fare transaction associated with a lower funds balance on the transit card application 112. If this situation is identified in the fare transactions associated with the mobile device 102, it can be inferred that the replenishment transaction completed, and the processing proceeds to block 212. The provisioning server 124 may also infer that the replenishment command was not received by the mobile device 102 if a plurality of fare transactions having a timestamp later than the timestamp associated with the replenishment command that was sent by the provisioning server. In this case, the provisioning server 124 may resume the process at block 204 and wirelessly retransmit the replenishment command. In other cases, however, no inference can be drawn from analyzing the fare transaction history table 148. When no inference can be drawn from the fare transaction history, the process 200 may repeat the processing of block 224 after waiting for predefined periods of time.

At block 228, if the replenishment is confirmed by the analysis, the processing proceeds from block 224 to block 212, otherwise the processing proceeds from block 224 to block 232.

After a time, if no inference can be drawn from analyzing the fare transaction history table 148, the method 200 proceeds to block 232 where a funds replenishment anomaly is reported, for example to an operator or an other employee of the transportation provider for manual recovery and/or adjustment of the funds balance of the transit card application 112. The method 200 then exits.

Figure 3:
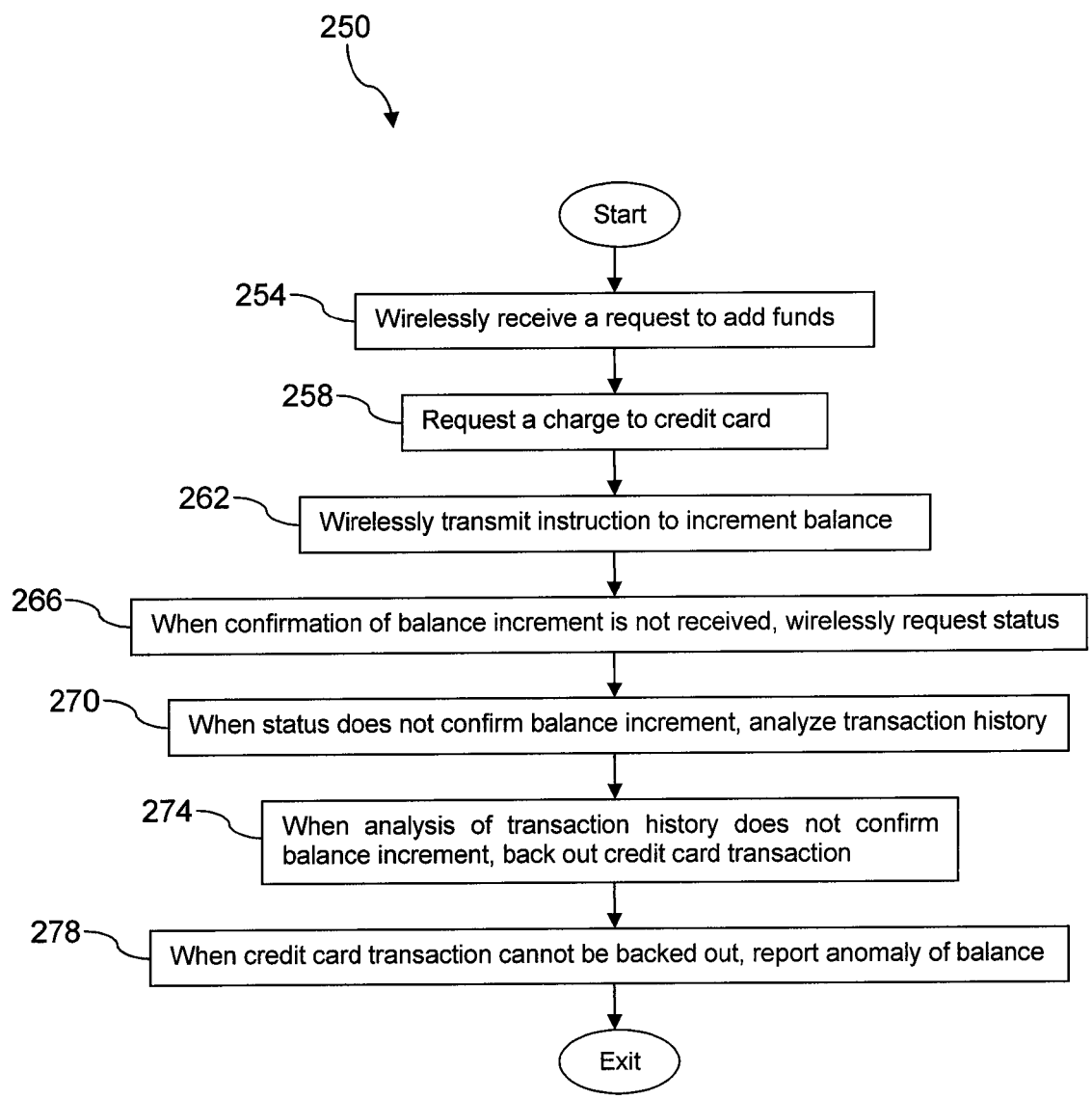
FIG. 3 is a flow chart of another method according to an embodiment of the disclosure.

Turning now to FIG. 3, a method 250 for automatic confirmation of funds replenishment is described. In block 254, a request to add funds is received wirelessly. In block 258, a request is made to charge a credit card in the amount of the funds replenishment, for example by the provisioning server 124 to the credit card payment processor 126. In block 262, an instruction to increment a funds balance is wirelessly transmitted. For example, the provisioning server 124 sends an instruction to increment the balance of the transit card application 112 via the network 122 to the base transceiver station 120 and wirelessly from the base transceiver station 120 to the mobile device 102.

In block 266, when confirmation of the balance increment is not received, for example within a predefined time period, the status of the balance increment transaction is wirelessly requested. If the confirmation of the balance increment is received, the method 250 exits. In block 270, when a reply to the status query is received, if the reply indicates the balance increment is pending on the mobile device 102, the process exits. In block 270, if the reply indicates the balance increment is not pending and has not completed, the provisioning server 124 may resend the balance increment instruction. The process 250 exits. In block 270, if no reply is returned, the transaction history is analyzed. The provisioning server 124, for example the top-up event reconciliation component 140, may analyze a series of entries in the fare transaction history table 148 associated with the mobile device 102 to infer the status of the balance increment transaction. In block 274, when no inference can be drawn from analyzing the fare transaction history table 148, for example after multiple attempts staggered in time to allow for the opportunity for the mobile device 102 to conduct a fare transaction with a fare gate 104 and/or for the fare transaction history table 148 to be updated, the charge to the credit card is backed out. For example, the credit card may not be charged by the credit card payment processor 126 and funds transferred to the transportation provider payment system 128 until a settlement time. If the settlement time has not occurred after the charge to the credit card was authorized, it may be possible to back out the charge without the charge ever being made to the credit card. In addition to backing out the charge from the credit card, a notification may be sent to the mobile device 102 that the funds transfer and/or top-up did not complete successfully. This may promote the user of the mobile device 102 taking some remedial action before simply being denied access to the transportation system. In block 278, when the charge to the credit card cannot be backed out, an anomaly report is generated and sent to an operator of the transport provider or to another for remediation of the funds balance of the transit card application 112. The transport provider may contact a user of the mobile device 102 to correct the funds balance on the mobile device 102 or to perform a charge back to the credit card. The method 250 then exits.

Figure 4:
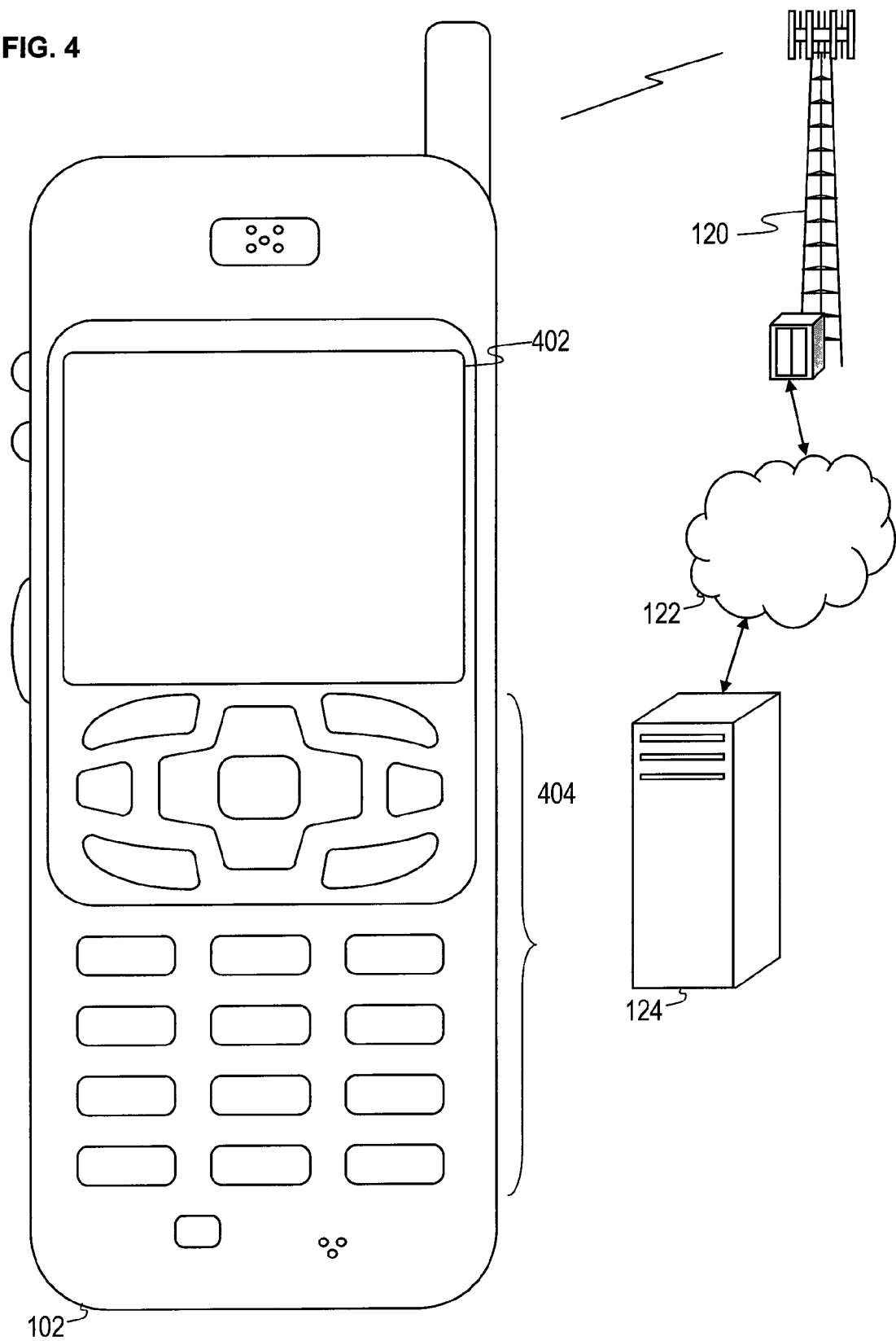
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a portable computer, a tablet computer, or a laptop computer. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer handset 102.

The mobile device 102 may execute a web browser application which enables the display 402 to show a web page. The web page may be obtained via wireless communications with the base transceiver station 120, a wireless network access node, a peer handset 102 or any other wireless communication network or system. The base transceiver station 120 (or wireless network access node) is coupled to the network 122. Via the wireless link and the wired network, the mobile device 102 has access to information on various servers, such as the provisioning server 124. The provisioning server 124 may provide content that may be shown on the display 402. Alternately, the mobile device 102 may access the base transceiver station 120 through a peer handset 102 acting as an intermediary, in a relay type or hop type of connection.

Figure 5:
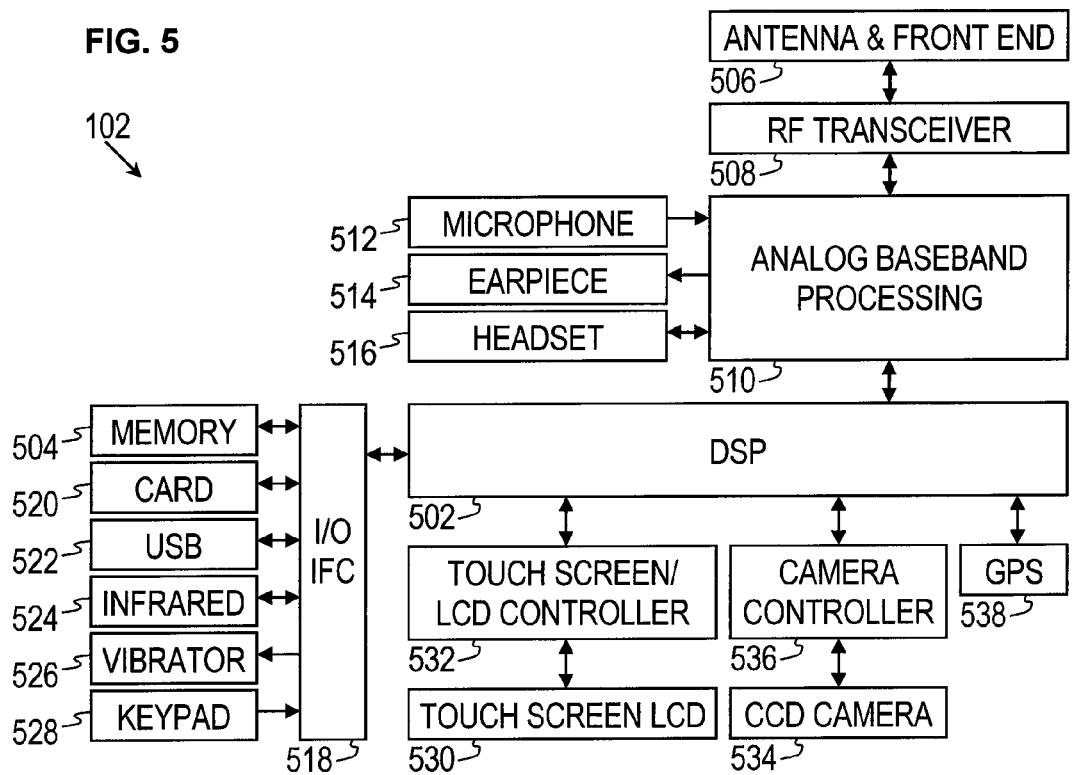
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver 508 may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
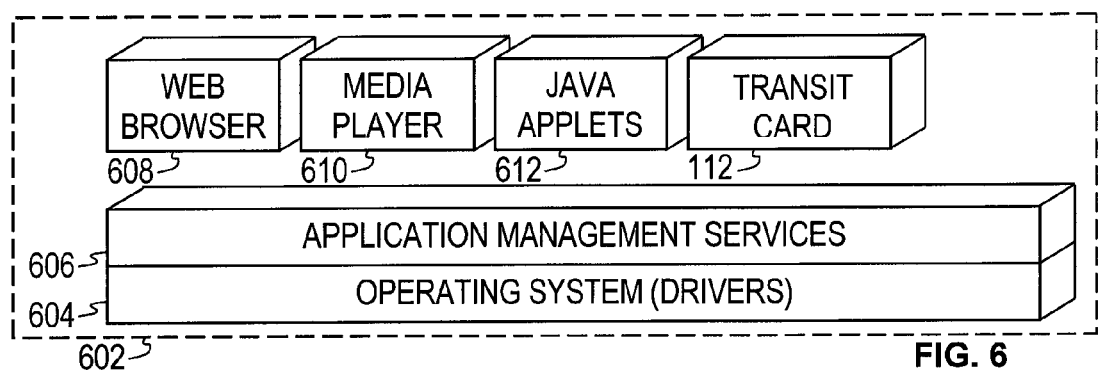
FIG. 6 is an illustration of a software architecture of a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, a plurality of JAVA applets 612, and the transit card application 112. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
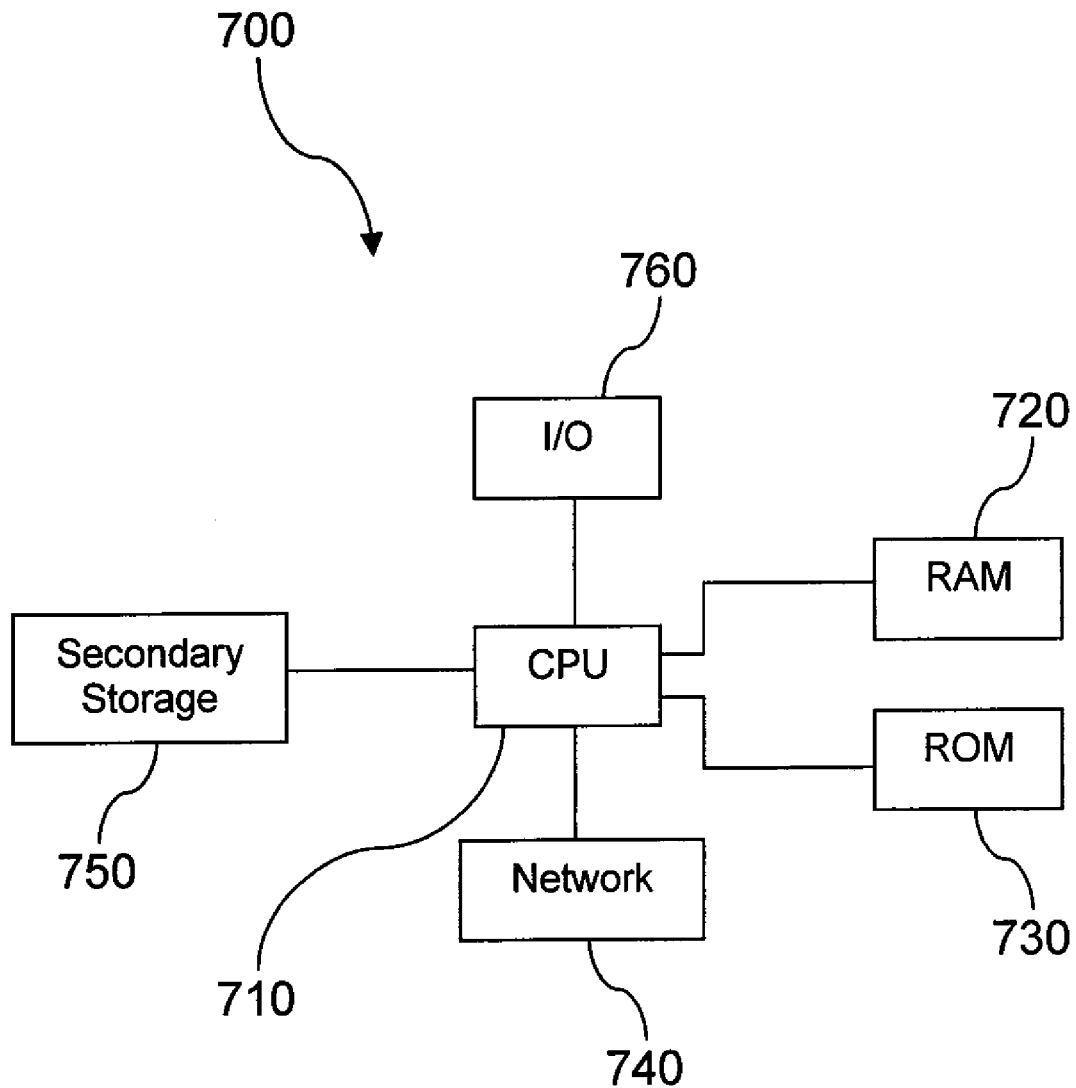
FIG. 7 illustrates an exemplary general purpose computer system suitable for implementing some aspects of the several embodiments of the disclosure.

Aspects of the system 100 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor 710 may be implemented as one or more CPU chips.

The secondary storage 750 is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 750. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 740 may enable the processor 710 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave.

Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 710 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a balance of a transit card, comprising:
   wirelessly receiving a request from a mobile device to add funds to the transit card;
   requesting by a server a charge in an amount of the funds to a credit card;
   wirelessly transmitting by the server an instruction to the mobile device to increment the balance of the transit card by the amount of the funds;
   determining that a confirmation that the balance of the transit card is incremented is not received by the server from the mobile device,
   subsequent to the determining that the confirmation that the balance of the transit card is incremented is not received, requesting a status of the transit card, wherein the status of the transit card indicates whether the balance of the transit card has been incremented;
   determining, responsive to the requesting, that the status of the transit card does not confirm that the balance of the transit card is incremented,
   subsequent to the determining that the status of the transit card does not confirm that the balance of the transit card is incremented, analyzing by the server a transaction history of changes in the balance of the transit card;
   determining that the analyzing the transaction history cannot confirm that the balance of the transit card is incremented,
   subsequent to the determining that the analyzing the transaction history cannot confirm that the balance of the transit card is incremented, attempting to back out by the server the charge to the credit card in the amount of the funds; and
   determining that the charge to the credit card cannot be backed out,
   subsequent to the determining that the charge to the credit card cannot be backed out, reporting an anomaly of the balance of the transit card.

2. The method of claim 1, wherein the amount of the funds is a uniform quantity for each request to add funds to the transit card.

3. The method of claim 2, wherein the amount of the funds is a predefined quantity.

4. The method of claim 1, wherein the transit card is an application on the mobile device, wherein the mobile device is one of a mobile phone, a personal digital assistant, and a media player.

5. The method of claim 1, further including receiving by the server at least a portion of the transaction history as a batch transfer on a periodic basis.

6. The method of claim 5, wherein the transaction history is received about once per day.

7. The method of claim 1, wherein the transit card is associated with funds to wirelessly pay fares in a mass transportation system.

8. The method of claim 1, wherein the analyzing by the server of the transaction history associated with the transit card further comprises comparing by the server a first transaction record of the transaction history with a second transaction record of the transaction history, where the second transaction record immediately follows the first transaction record in time order in the transaction history.

9. The method of claim 8, wherein the server determines that analyzing the transaction history cannot confirm that the balance of the transit card is incremented based on a funds balance of the second transaction record not being greater than a funds balance of the first transaction record.

* * * * *